United States Patent [19]
Miller et al.

[11] 4,362,919
[45] Dec. 7, 1982

[54] METHOD OF WELDING USING A COVERED TUNGSTEN ELECTRODE

[75] Inventors: Alan H. Miller, Philadelphia, Pa.; Ira W. Reese, Yardville, N.J.

[73] Assignee: Transamerica Delaval, Inc., Lawrenceville, N.J.

[21] Appl. No.: 235,642

[22] Filed: Feb. 18, 1981

[51] Int. Cl.³ ............................................. B23K 9/225
[52] U.S. Cl. ................................. 219/137 R; 219/75; 219/145.21
[58] Field of Search ............... 219/137 R, 75, 146.21, 219/145.21

[56] References Cited

U.S. PATENT DOCUMENTS

| 2,555,017 | 5/1951 | Tuthill | 219/75 |
| 3,018,360 | 1/1962 | Engeh | 219/75 X |
| 3,025,387 | 3/1962 | Vinney | 219/75 X |
| 3,576,966 | 5/1971 | Sullivan | 219/137 R |
| 3,670,140 | 6/1972 | Roberts | 219/137 R |
| 3,770,302 | 11/1973 | Hallenbeck | 219/137 R X |
| 4,258,247 | 3/1981 | Shimada | 219/137 R |
| 4,302,657 | 11/1981 | Turelli | 219/137 R |

Primary Examiner—Elliot A. Goldberg

[57] ABSTRACT

A method of welding which utilizes a metal electrode core encased within a pre-sintered ceramic insulating sleeve. The method comprising, preplacing a welding wire in the welding kerf formed between the pieces to be welded, tacking the welding wire in place such that the wire abuts the surface of the pieces to be welded, guiding the metal core electrode rod encased in a ceramic pre-sintered sleeve over the welding wire, and simultaneously, torching the welding wire so that a uniform weld deposit is formed.

7 Claims, 2 Drawing Figures

METHOD OF WELDING USING A COVERED TUNGSTEN ELECTRODE

BACKGROUND OF THE INVENTION

1. Field of Invention

The present invention relates to a method of welding, more particularly it relates to a method of welding which utilizes a metal electrode core encased within a pre-sintered ceramic insulating sleeve.

2. Description of the Prior Art

Although the present invention is discussed in terms of the preparation of three-dimensional compressor impellers, it should be understood that the present method is applicable to all welding situations which require that a strong and continuous weld, free of air pockets and slag deposits, be effected in physically confined areas.

Prior techniques for fabricating compressor impellers have involved the use of various casting methods; a problem, however, normally associated with these cast impellers is that they utilize a radial impeller blade which does not provide for maximum flexibility and optimum stage matching. Moreover, in use, radial impeller blade designs can accommodate only limited inlet velocity distributions, each having a single specific flow capability.

Many of the above-mentioned problems associated with radial impeller design blades have been overcome by the advent of impellers having the so-called three-dimensional design. These impellers utilize inlet blade angles which vary from the hub of the impeller to the shroud, allowing these type of blades to accommodate varying inlet velocity distributions, thereby providing improved performance over that of the conventional radial blade designed impellers. The three-dimensional design is also advantageous in that it can accommodate larger flows in closed impeller systems.

The new three-dimensional impeller design discussed above, however, requires a method of welding which can be accomplished through the narrow opening at the inlet and the outlet ports of the impeller. The desired welding process must therefore employ an electrode which not only is capable of being manipulated through the narrow openings but also be capable of providing a satisfactory weld deposit.

Welding techniques utilizing electrodes and specifically coated electrodes are well known in the art. The welding electrodes utilized in the past normally comprise a metal core rod or wire encased within a ceramic coating. As is known in the art, the coating may be effectuated by using a ceramic dipping technique. However, a problem which arises when utilizing the ceramic-dipped electrode is that the ceramic tends to flake during the actual welding process, adversely affecting the resulting weld deposit.

The present invention has overcome the problems encountered with the prior art welding processes by providing a welding electrode which is insulated using a pre-sintered ceramic sleeve. It has been found that the electrodes of the present invention resist chipping and spalling better than the prior art ceramic dipped electrodes, and therefore, produce a weld deposit free of contaminants and air pockets. Moreover, the use of a presintered ceramic sleeve provides a more uniform weld deposit and allows a more continuous welding without replacement of the metal core.

It is therefore an object of the present invention to provide a method of welding for the manufacture of a three-dimensional blade impeller design which gives maximum flexibility and optimum stage matching for a standard fabricated compressor line.

Another object of the present invention is to provide an improved welding electrode which gives a uniform and continuous weld deposit.

A further object of the present invention is to achieve the foregoing objects at substantial savings of material and labor, in both the coating and welding operation.

Still other objects and various further features of novelty and invention will become apparent from reading of the following specification in conjunction with the accompanying drawings.

BRIEF DESCRIPTION OF THE DRAWINGS

For a fuller understanding of the invention, reference is made to the following descriptions taken in connection with the accompanying drawings of the preferred embodiment in which.

DESCRIPTION OF THE PREFERRED EMBODIMENT

The present invention is directed to a welding process, and more particularly, to a welding process for welding compressor impellers. The welding process utilizes a welding electrode comprising a metal core rod having an insulating sleeve thereover; the sleeve being formed of a pre-sintered ceramic material. It has been found that the ceramic sleeve not only acts as an insulator but also resists chipping and flaking during the welding process, thereby providing a continuous and uniform weld deposit.

Figure 1:
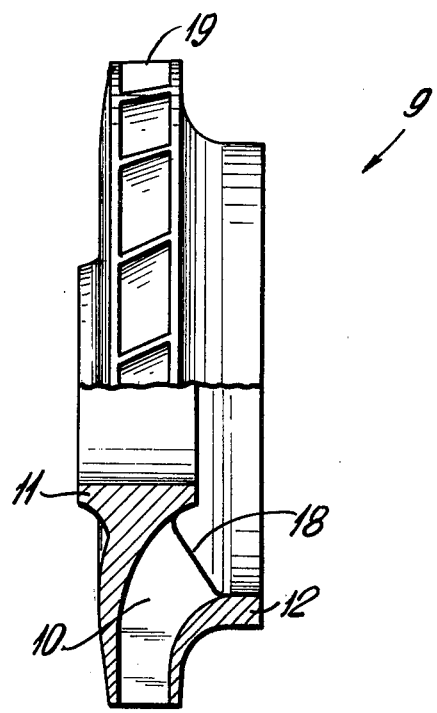
FIG. 1 is a cross-sectional view of a three-dimensional designed compressor impeller.

As stated above, and as can be seen from FIG. 1, the three-dimensional design impeller 9 utilizes a variable inlet blade angle 10 which extends from hub 11 to shroud 12 to accommodate varying inlet volocity distributions. In view of the obvious physical restriction of this design, it is necessary to provide a method of welding which can accomplish a strong, clean weld through a narrow opening, such as the inlet ports 18 and outlet ports 19 of the impeller.

Figure 2:
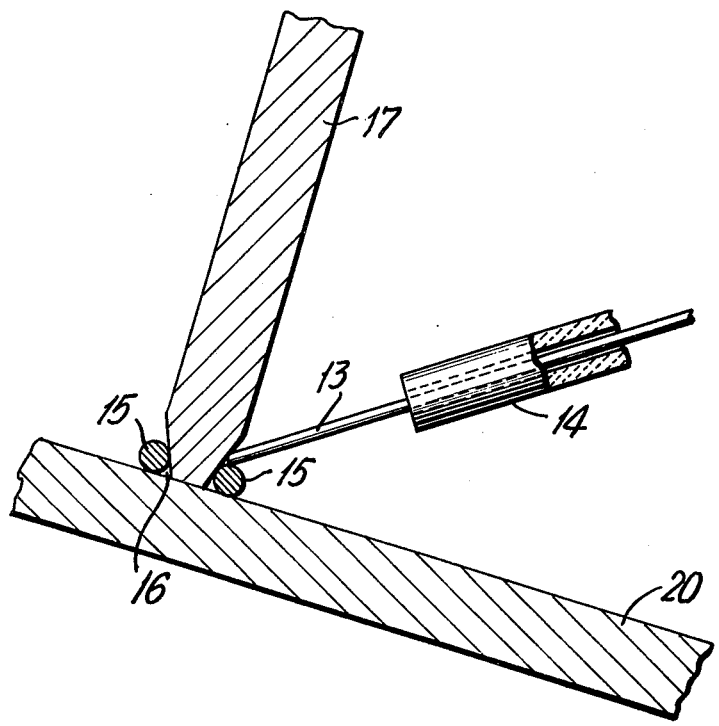
FIG. 2 is an illustrative cross-sectional view of an impeller blade showing the positioning of the welding wire and the welding electrodes in the welding kerf located on the sides of the impeller blade.

Referring now more particularly to FIG. 2, there is shown a schematic diagram illustrating the positioning of the various components necessary to accomplish the welding process of the present invention. Reference number 13 designates the metal core electrode which is enshrouded by the pre-sintered ceramic sleeve 14. In this regard the bore in the ceramic sleeve should be sized so as to prevent slippage on the core while allowing for sufficient clearance for the core to expand during torching. It has been found that good results have been obtained if the bore in the sleeve is about 0.015 to 0.020 of an inch larger than the diameter of the core. In addition, the core tip should extend from about $\frac{3}{8}$ to $1\frac{1}{4}$ of an inch past the end of the sleeve so as to allow for proper torching while preventing a significant portion of the electrode from being exposed to shorting. Note that although not shown in the drawing, the metal core may be pre-bent to any configuration to facilitate its insertion through the inlet and outlet ports of the impeller. This pre-bending may be accomplished by heating the rod to a temperature at which bending will occur.

After the electrode is pre-formed and insulated, welding wire 15 is preplaced and tacked in welding kerf 16 on both sides of impeller blade 17. Impeller blade 17 is then welded to a shroud 20 by guiding electrode 13 over welding wire 15 while torching. As would be understood by one skilled in the art, the heat for the fusion of metals is provided by an electric arc created between electrode 13 and welding wire 15.

In order to obtain a clean weld, i.e., one free of air pockets and slag deposits, the process should take place in an inert gas atmosphere; preferably the use of 99.9% pure argon has been found to give satasfactory results. The use of liquified argon gas has also been useful in providing a clean atmosphere in the welding chamber.

It has been observed that the use of a pure tungsten core provides a clean and continuous weld, however, as would be understood by one skilled in the art, the tungsten electrode may contain from 1 to 3% of thorium.

The welding wire may consist of any carbon steel, alloy steel, stainless steel, copper-based or nickel-based material; the exact composition being dependent upon the composition of the material being welded. For example, if welding a chromium-nickel molybdenum steel, it has been found that chromium nickel welding wire gives best results, whereas the welding of stainless steel or age hardening monel requires the use of a stainless steel or monel welding wire, respectively.

Lastly, although the sleeve utilized in the present invention has been disclosed as being made of a ceramic material, and more particularly, a recrystallized aluminum oxide, it is not to be construed as so limited; indeed, the sleeve may be formed of any other vitreous or non-metallic minerals having a high enough melting point to prevent melting during welding.

The invention is illustrated by the following example:

The components of a three-dimensional compressor impeller, similar to those depicted in the drawings, were arranged in a welding chamber having an inert gas atmosphere of 99.9% pure argon. The components of the impeller were made of chromium-nickel molybdenum steel. AWS A5.28 CL ER100S-1 welding wire was preplaced and tacked in the welding kerf on both sides of the impeller blade which was to be welded to the shroud of the blade. A tungsten electrode enshrouded in a pre-sintered ceramic sleeve was guided over the welding wire while torching. Torching was accomplished using a Miller gas tungsten arc rectifier operated at about 15 volt and approximately 100 amps. After welding, the impeller was removed from the welding chamber, cooled and cleaned. An examination of the impeller showed that a clean, continuous weld deposit, free of air pockets and debris, had been effected.

Although the present invention has been described in conjunction with preferred embodiments, it is to be understood that modifications and variations may be restored to without departing from the spirit and scope of the invention as those skilled in the art will readily understand. Such modifications and variations may be resorted to without departing from the spirit and scope of the invention and the appended claims.

What is claimed is:

1. A method for welding a plurality of blades of a centrifugal compressor impeller to the hub of said impeller, which comprises the steps of:
   (a) preplacing a welding wire in the welding kerf formed on both sides of each impeller blade of said plurality of blades;
   (b) tacking the welding wire so that the wire abuts the surface of the impeller blade and the hub;
   (c) guiding a metal core electrode rod encased in a pre-sintered ceramic sleeve over the welding wire the bore of said sleeve being sized so as to prevent slippage on the core while allowing for sufficient clearance for the core to expand during torching and the working end portion of said core extends beyond said sleeve; and
   (d) torching the welding wire as the encased electrode is guided over the wire so that a uniform weld deposit is formed, thereby welding said impeller blade to said hub.

2. The method as claimed in claim 1, wherein the metal core rod is tungsten.

3. The method as claimed in claim 2, wherein the bore in the pre-sintered ceramic sleeve, through which the metal core extends is sized 0.015 to 0.020 of an inch larger than the outer diameter of said tungsten to provide said clearance for expansion.

4. The method as claimed in claim 1, wherein the metal electrode and ceramic sleeve is bent to a predetermined condition prior to use.

5. The method as claimed in claim 2, which further includes the step of welding in an inert gas atmosphere.

6. The method as claimed in claim 5, wherein the inert gas is argon.

7. The method of claim 3, wherein the working end portion of the core extends from about ⅜ to 1¼ of an inch beyond the pre-sintered sleeve.

* * * * *